(12) United States Patent
Kitou

(10) Patent No.: US 9,701,222 B2
(45) Date of Patent: Jul. 11, 2017

(54) VEHICLE SEAT AND METHOD FOR MANUFACTURING THE SAME

(71) Applicants: TOYOTA BOSHOKU KABUSHIKI KAISHA, Aichi-ken (JP); SHIROKI CORPORATION, Kanagawa (JP)

(72) Inventor: Hidekazu Kitou, Seto (JP)

(73) Assignees: TOYOTA BOSHOKU KABUSHIKI KAISHA, Aichi-Ken (JP); SHIROKI CORPORATION, Kanagawa (JP)

( * ) Notice: Subject to any disclaimer, the term of this patent is extended or adjusted under 35 U.S.C. 154(b) by 0 days.

(21) Appl. No.: 14/694,301

(22) Filed: Apr. 23, 2015

(65) Prior Publication Data

US 2015/0306987 A1    Oct. 29, 2015

(30) Foreign Application Priority Data

Apr. 25, 2014 (JP) ................................. 2014-091073

(51) Int. Cl.
*B60N 2/235* (2006.01)

(52) U.S. Cl.
CPC ........... *B60N 2/2352* (2013.01); *B60N 2/236* (2015.04); *B60N 2205/50* (2013.01)

(58) Field of Classification Search
CPC ................................................... B60N 2/2352
See application file for complete search history.

(56) References Cited

U.S. PATENT DOCUMENTS

| 4,541,672 | A | * | 9/1985 | Fukuta | B60N 2/2352 |
| | | | | | 297/366 |
| 5,224,759 | A | * | 7/1993 | Matsuura | B60N 2/2352 |
| | | | | | 297/367 R |

(Continued)

FOREIGN PATENT DOCUMENTS

| CN | 101252856 | 8/2008 |
| CN | 101412381 | 4/2009 |

(Continued)

OTHER PUBLICATIONS

Official Action, along with English-language translation thereof, in CN Appl. No. 201510201139.7 dated Dec. 28, 2016.

(Continued)

*Primary Examiner* — Timothy J Brindley
(74) *Attorney, Agent, or Firm* — Greenblum & Bernstein, P.L.C.

(57) ABSTRACT

A vehicle seat includes paired right and left recliners; operating pins respectively inserted through the recliners in an axial direction, and rotated about axes thereof to respectively unlock the recliners; and a rod that integrally connects the operating pins. One operating pin includes an operating shaft portion inserted through, and connected to one recliner, and a connection portion that contacts the rod and is connected to the rod. An insertion depth of the operating shaft portion with respect to the one recliner can be changed by moving the operating shaft portion between a first position in which the connection portion contacts the rod to be connectable to the rod, and a second position in which the connection portion is away from the rod in the axial direction. The operating shaft portion is connected to the one recliner so as to operate the one recliner, in the first position.

6 Claims, 11 Drawing Sheets

(56) References Cited

U.S. PATENT DOCUMENTS

| | | | | |
|---|---|---|---|---|
| 5,702,156 A * | 12/1997 | Takagi | B60N 2/2352 297/366 |
| 7,201,447 B2 * | 4/2007 | Yamada | B60N 2/236 297/216.13 |
| 7,992,938 B2 * | 8/2011 | Kojima | B60N 2/236 297/354.12 |
| 8,033,607 B2 * | 10/2011 | Kojima | B60N 2/2358 297/341 |
| 8,864,234 B2 * | 10/2014 | McCulloch | B60N 2/2358 297/367 P |
| 2003/0102705 A1 * | 6/2003 | Pejathaya | B60N 2/01583 297/378.12 |
| 2007/0039183 A1 | 2/2007 | Krambeck et al. | |
| 2007/0102982 A1 * | 5/2007 | Yamada | B60N 2/2356 297/367 R |
| 2008/0093906 A1 * | 4/2008 | Gruson | B60N 2/2356 297/361.1 |
| 2011/0115272 A1 * | 5/2011 | Kojima | B60N 2/2352 297/367 R |
| 2011/0156462 A1 * | 6/2011 | Lim | B60N 2/20 297/354.12 |
| 2012/0261964 A1 * | 10/2012 | Yamaguchi | B60N 2/12 297/378.14 |
| 2015/0035338 A1 * | 2/2015 | Endou | B60N 2/2352 297/367 R |
| 2015/0035339 A1 * | 2/2015 | Endou | B60N 2/236 297/367 R |

FOREIGN PATENT DOCUMENTS

| | | |
|---|---|---|
| JP | 2-299608 | 12/1990 |
| JP | 4-58140 | 5/1992 |
| JP | 2003-189962 | 7/2003 |
| JP | 2007-252451 | 10/2007 |
| JP | 2007-325772 | 12/2007 |
| JP | 2009-95432 | 5/2009 |
| JP | 2010-187906 | 9/2010 |

OTHER PUBLICATIONS

Official Action, along with English-language translation thereof, in JP Appl. No. 2014-091073 drafted Apr. 27, 2017.

* cited by examiner

VEHICLE SEAT AND METHOD FOR MANUFACTURING THE SAME

INCORPORATION BY REFERENCE

The disclosure of Japanese Patent Application No. 2014-091073 filed on Apr. 25, 2014 including the specification, drawings and abstract is incorporated herein by reference in its entirety.

BACKGROUND OF THE INVENTION

1. Field of the Invention

The invention relates to a vehicle seat and a method for manufacturing the same. More specifically, the invention relates to a vehicle seat including paired right and left recliners that respectively connect side frames in right and left sides of a seat back to a base on or above a floor, operating pins that are respectively inserted through the recliners in an axial direction and are rotated about axes thereof to respectively unlock the recliners, and a rod that integrally connects the operating pins to each other, and the invention also relates to a method for manufacturing the vehicle seat.

2. Description of Related Art

Japanese Patent Application Publication No. 2-299608 (JP 2-299608A) describes a vehicle seat in which a seat back is connected to a seat cushion via paired right and left recliners. The recliners are normally maintained in a locked state in which a reclining angle of the seat back is fixed. Both of the recliners are unlocked and the state of the seat back is switched to the state in which the reclining angle of the seat back can be changed, by pulling up an unlocking lever provided on a side portion of the seat cushion on a vehicle outer side. More specifically, operating pins that respectively unlock the recliners are respectively inserted through the recliners from an inner side in an axial direction, and are respectively fitted to the recliners. The operating pins are integrally connected to each other via a rod. The unlocking lever is fitted to an outer end portion of the operating pin on the vehicle outer side. Thus, when the unlocking lever is pulled up, both of the operating pins are rotated together about the axes thereof, and both of the recliners are unlocked.

In the related art, the operating pins are respectively inserted through the side frames of the seat back from a seat inner side, and are respectively fitted to the side frames in the state in which the operating pins are positioned. Accordingly, in order to dispose the operating pins integrally connected to the rod between the side frames, the operating pins integrally connected to the rod need to be inserted into the side frames before the side frames are integrally connected to each other. Otherwise, it would not be possible to insert the rod into the operating pins, and therefore, it would be necessary to bring the rod into contact with the operating pins from an outer side in a radial direction and to weld the rod to the operating pins. Accordingly, the man-hour would be increased due to, for example, the operation of deforming end portions of the rod, and in addition, the connection strength between the operating pins and the rod may not be appropriately increased.

SUMMARY OF THE INVENTION

The invention makes it possible to respectively insert operating pins for recliners through side frames from an inner side, and to insert a rod between the operating pins to connect the operating pins to each other, after the side frames are integrally connected to each other.

A first aspect of the invention relates to a vehicle seat including paired right and left recliners that respectively connect side frames in right and left sides of a seat back to a base on or above a floor; operating pins that are respectively inserted through the recliners in an axial direction, and are respectively rotated about axes thereof to respectively unlock the recliners; and a rod that integrally connects the operating pins to each other. One of the operating pins includes an operating shaft portion that is inserted through one of the recliners from a seat inner side in the axial direction and is connected to the one recliner, and a connection portion that contacts the rod and is connected to the rod, the operating shaft portion and the rod being arranged in the axial direction; an insertion depth of the operating shaft portion with respect to the one recliner is able to be changed by moving the operating shaft portion between a first position in which the connection portion contacts the rod and is connectable to the rod, and a second position in which the connection portion is away from the rod in the axial direction; and the operating shaft portion is connected to the one recliner so as to operate the one recliner, in the first position.

According to the above-mentioned aspect, an insertion depth of one of the operating pins with respect to one of the recliners is able to be changed by moving the operating pin between the first position and the second position. Therefore, it is possible to respectively insert the operating pins for the recliners through the side frames from the seat inner side, and to insert the rod between the operating pins to connect the operating pins to each other, after the side frames of the seat back are integrally connected to each other.

In the above-mentioned aspect, the one operating pin may further include a restriction portion that restricts movement of the operating shaft portion with respect to the one recliner, up to the second position.

With the configuration, the restriction portion prevents the one operating pin from falling off the one recliner toward the outside of the vehicle seat. Thus, it is possible to easily perform the fitting operation.

In the above-mentioned aspect, the operating pins may be constituted by components that are identical to each other. The operating shaft portion of the one operating pin is able to be moved between the first position in which the connection portion contacts the rod so as to be connectable to the rod, and the second position in which the connection portion is away from the rod in the axial direction. In contrast, the other of the operating pins may be connected to the rod in a state in which the operating shaft portion of the other operating pin is inserted through the other of the recliners to the insertion depth corresponding to the second position; and an unlocking lever provided to perform an operation for unlocking both of the recliners may be fitted to an extra-length portion of the operating shaft portion of the other operating pin, the extra-length portion protruding from the other recliner to an outside of the vehicle seat.

With the configuration, even in the case where the one operating pin and the other operating pin are constituted by the components that are identical to each other, each of the operating pins does not include a region that unnecessarily protrudes from the one recliner to the outside of the vehicle seat. Accordingly, the vehicle seat can be made compact in the width direction.

A second aspect of the invention relates to a method for manufacturing a vehicle seat including paired right and left recliners that respectively connect side frames in right and left sides of a seat back to a base on or above a floor; operating pins that are respectively inserted through the recliners in an axial direction, and are respectively rotated about axes thereof to respectively unlock the recliners; and a rod that integrally connects the operating pins to each other. The method includes: connecting the side frames in the right and left sides of the seat back to each other to form one unit; inserting the operating pins through the recliners from a seat inner side in the axial direction to connect the operating pins to the recliners; bringing the rod into contact with one of the operating pins, and connecting the rod to the one operating pin; and sliding the other of the operating pins to a position in which the other operating pin contacts the rod, and connecting the other operating pin to the rod, wherein the other operating pin is slid in a direction in which an insertion depth of the other operating pin with respect to the corresponding recliner is reduced.

According to the above-mentioned method, the insertion depth of the other operating pin with respect to the corresponding recliner is able to be changed. Therefore, it is possible to respectively insert the operating pins for the recliners through the side frames from the seat inner side, and to insert the rod between the operating pins to connect the operating pins to each other, after the side frames of the seat back are integrally connected to each other.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described with reference to the drawings.

Figure 1:
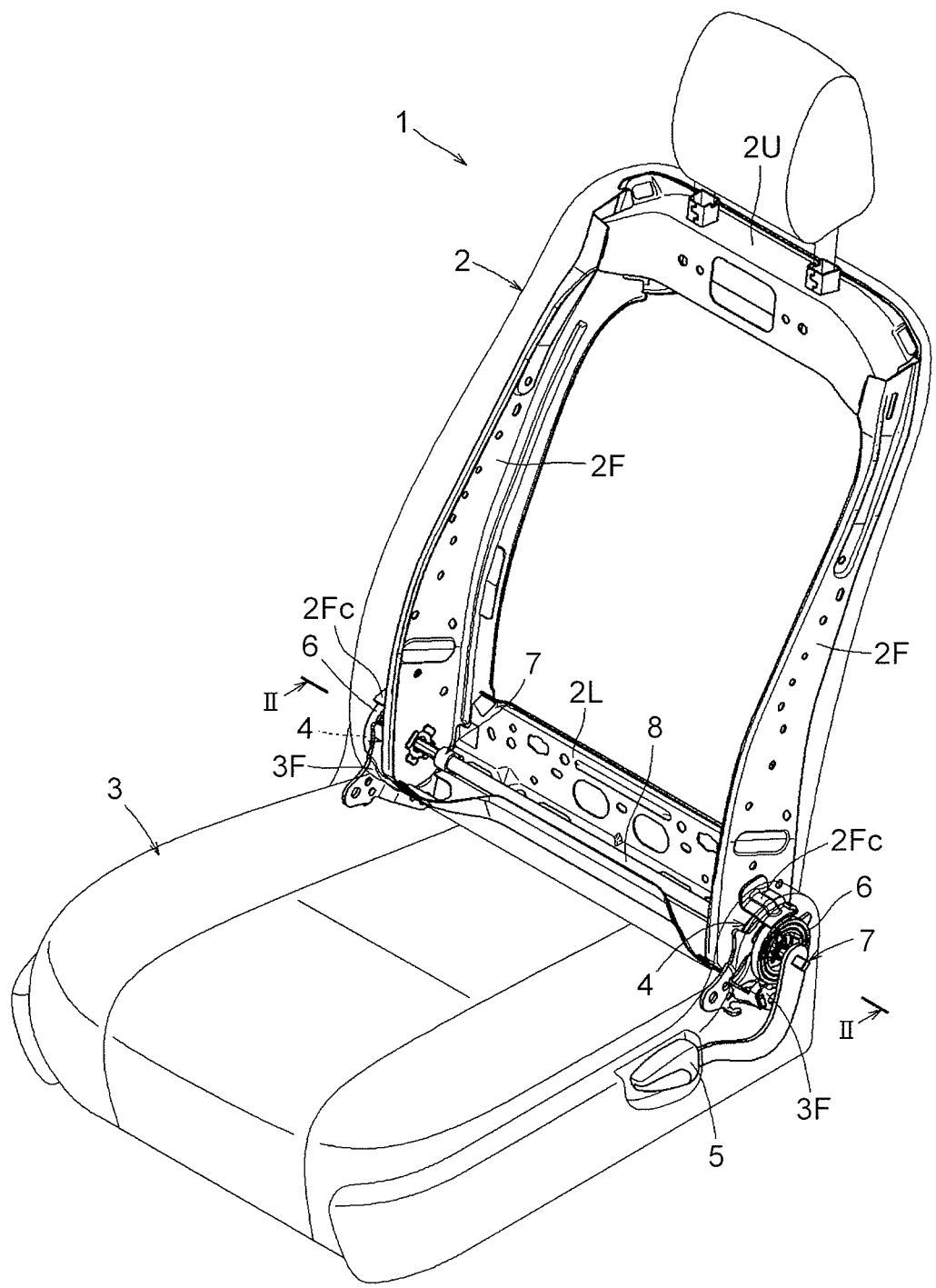
FIG. 1 is a perspective view showing a schematic configuration of a vehicle seat according to a first embodiment of the invention.

A seat 1 according to a first embodiment and a method for manufacturing the seat 1 will be described with reference to FIG. 1 to FIG. 11. As shown in FIG. 1, the seat 1 according to the embodiment is configured as a passenger's seat of an automobile. The seat 1 includes a seat back 2 that is a back portion for a seated occupant, and a seat cushion 3 that is a seating portion. Lower end portions of right and left sides of the seat back 2 are respectively connected to rear end portions of right and left sides of the seat cushion 3 via recliners 4 that function as rotary shaft devices (coupling devices) that can be locked. Thus, the seat back 2 is normally maintained in the state in which a reclining angle thereof is fixed by the recliners 4. By pulling up an unlocking lever 5 provided on a side portion of the seat cushion 3 on a vehicle outer side, the reclining angle, which has been fixed by the recliners 4, is released, and the state of the seat back 2 is switched to the state in which the reclining angle can be adjusted in a front-rear direction. The seat cushion 3 corresponds to a "base" according to the invention.

More specifically, the recliners 4 are respectively provided between lower end portions of side frames 2F that are frame portions of right and left side portions of the seat back 2, and rear end portions of side frames 3F that are frame portions of right and left side portions of the seat cushion 3. Thus, the recliners 4 respectively connect the side frames 2F and the side frames 3F (refer to FIG. 2 to FIG. 5). Each side frame 2F of the seat back 2 is located inside the corresponding side frame 3F of the seat cushion 3. Each recliner 4 is provided between the corresponding side frame 2F and the corresponding side frame 3F.

An upper frame 2U is disposed between upper end portions of the side frames 2F of the seat back 2 to be integrally connected to the upper end portions of the side frames 2F of the seat back 2. A lower plate 2L is disposed between lower end portions of the side frames 2F to be integrally connected to the lower end portions of the side frames 2F. Thus, the upper frame 2U, the side frames 2F, and the lower plate 2L form a substantially rectangular frame shape in a front view. The lower plate 2L has a shape formed by bending one steel plate material. More specifically, the lower plate 2L has a J-shaped cross-section. The lower plate 2L is disposed between the lower end portions of the side frames 2F to be connected to the lower end portions of the side frames 2F, in other words, the lower plate 2L is firmly and integrally connected to the lower end portions of the side frames 2F by welding. More specifically, edge portion surfaces of right and left sides of the lower plate 2L are respectively fitted to, and welded to edge portion surfaces of rear sides of the side frames 2F, the edge portion surfaces of the rear sides of the side frames 2F being bent toward a seat inner side. Further, the edges of the edge portion surfaces of the lower plate 2L are covered from an outer side by the side frames 2F such that the edges are not likely to protrude to the outside.

The J-shape of the cross-section of the lower plate 2L is a curved shape that extends along the rounded shape of the peripheral edge portion of the lower end side of each side frame 2F. The lower plate 2L is fitted such that the cross-section of the lower plate 2L extends along the shape of the peripheral edge portion of the lower end side of each side frame 2F. Thus, the lower plate 2L is provided so as to protect a rod 8 (described later) from below. The rod 8 is disposed between the lower end portions of the side frames 2F, and the rod 8 connects operating pins 7 for the recliners 4 to each other.

As shown in FIG. 1, the recliners 4 are normally maintained in a locked state in which the reclining angle of the seat back 2 is fixed, due to an urging force. Both of the recliners 4 are unlocked by an operation of pulling up the unlocking lever 5 provided on the side portion of the seat cushion 3 on the vehicle outer side. Thus, the state of the recliners 4 is switched to an unlocked state in which the reclining angle of the seat back 2 can be changed.

More specifically, the operating pins 7 that respectively unlock the recliners 4 are respectively inserted through center portions of the recliners 4 in an axial direction, and are fitted to the recliners 4. The operating pins 7 are integrally connected to each other via the rod 8. The unlocking lever 5 is fitted to an outer end portion of the operating pin 7 on the vehicle outer side. Thus, when the unlocking lever 5 is pulled up, both of the operating pins 7 are rotated together about axes thereof, and as a result, both of the recliners 4 are unlocked. When the unlocking lever 5, which has been pulled up, is released, the recliners 4 are brought back to the locked state in which the reclining angle of the seat back 2 is fixed, due to the urging force.

Return springs 6 are respectively mounted between the side frames 2F in the right and left sides of the seat back 2 and the side frames 3F in the right and left sides of the seat cushion 3. The return springs 6 normally apply the urging force to the seat back 2 in a direction in which the seat back 2 is rotated forward. Each return spring 6 is constituted by a spiral spring. An inner end portion of the return spring 6 is engaged with a spring hook portion 3Fc formed by cutting and bending a portion of the corresponding side frame 3F of the seat cushion 3. An outer end portion of the return spring 6 is engaged with a bracket 2Fc connected to an outer surface of the corresponding side frame 2F of the seat back 2 (refer to FIG. 2).

When the recliners 4 are released from the locked state in which the reclining angle is fixed, the seat back 2 rises up to a position in which the seat back 2 touches the back of a seated occupant, due to the urging force of the return springs 6, and the reclining angle can be freely adjusted in the front-rear direction in accordance with the movement of the back of the seated occupant who tilts his or her back in the front-rear direction. Since the above-mentioned urging structure is provided, the reclining angle of the seat back 2 can be easily adjusted.

The seat back 2 can rotate in a rotation range from a forward tilting position in which the seat back 2 is in a forward tilting posture, in other words, the seat back 2 is tilted forward toward the seat cushion 3, to a rearward tilting position in which the seat back 2 is tilted rearward, in other words, the seat back 2 falls down rearward. In the above-mentioned rotation range, a rotation range (a reclining angle range) of approximately 90 degrees from a position in which the seat back 2 stands upright to the rearward tilting position is set as a rotation range called a "lock zone" in which the seat back 2 is brought back to the state in which the reclining angle is fixed, by stopping the operation of pulling up the unlocking lever 5. A rotation range from a position in which the reclining angle of the seat back 2 is forward of the lock zone, to the forward tilting position is set as a rotation range called a "free zone" in which the seat back 2 is not brought back to the state in which the reclining angle is fixed, even when the operation of pulling up the unlocking lever 5 is stopped.

The rotation range called the lock zone and the rotation range called the free zone are respectively set by a lock zone and a free zone set in the recliners 4 (described later). Since the rotation range called the free zone is provided, when the seat back 2 is tilted up to a position in the free zone due to the urging force by operating the unlocking lever 5 in the state in which no occupant is seated in the seat 1, the seat back 2 is automatically tilted forward to the forward tilting position thereafter, even if the operation of the unlocking lever 5 is not continued.

Figure 4:
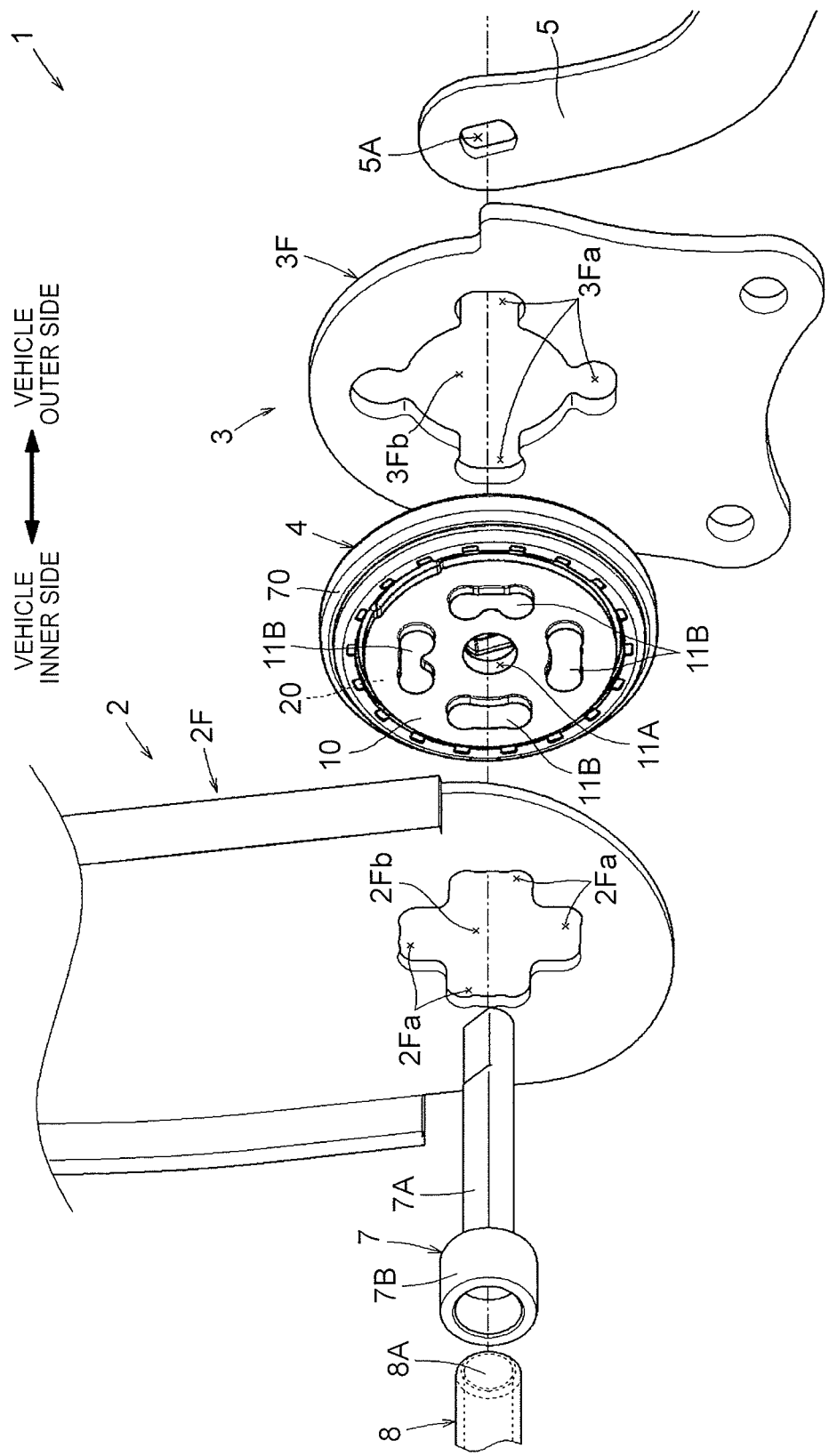
FIG. 4 is an exploded perspective view showing fitted portions of a recliner seen from one side.
Figure 5:
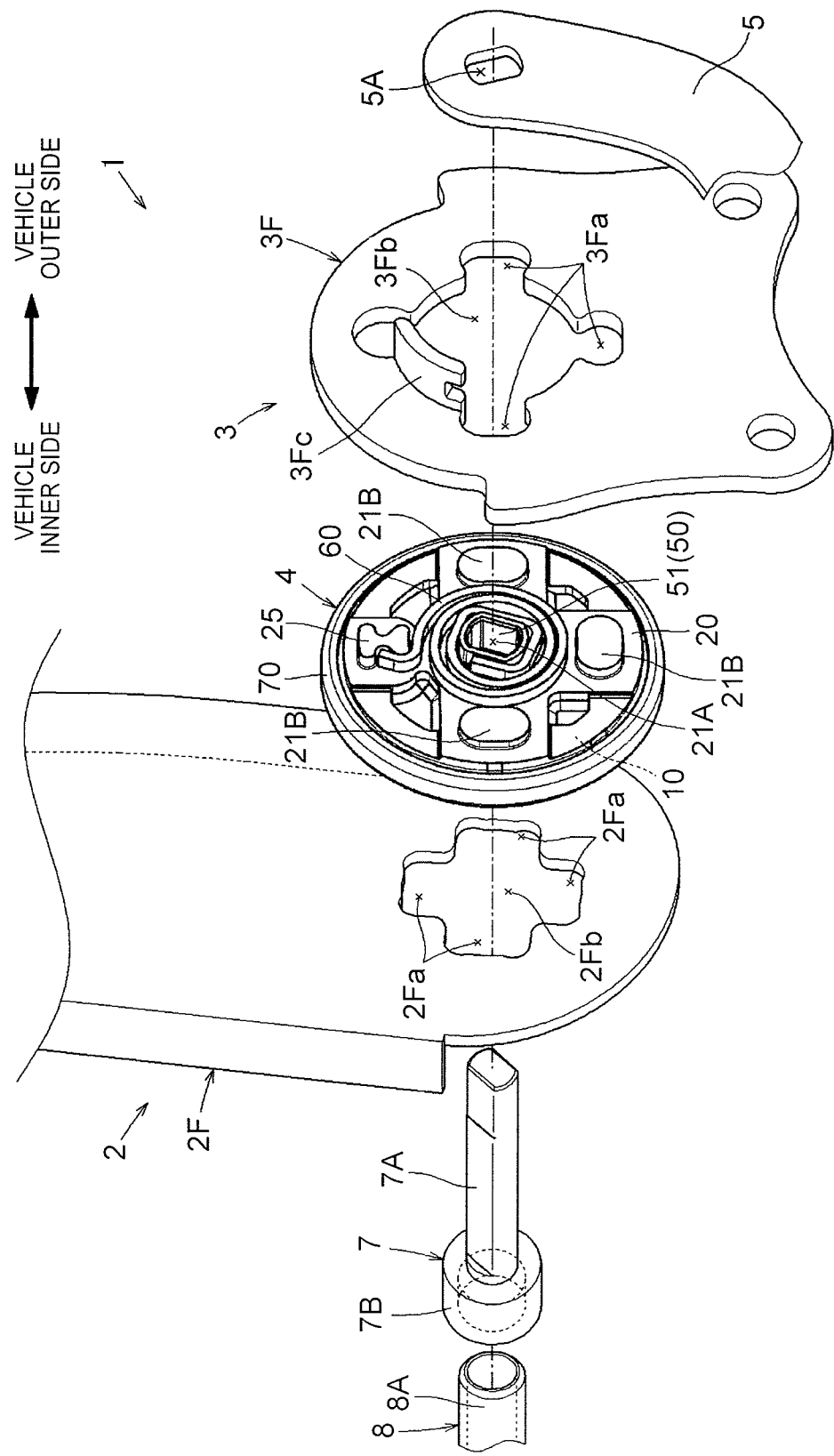
FIG. 5 is an exploded perspective view showing the fitted portions of the recliner seen from the other side.

As shown in FIG. 4 to FIG. 5, each recliner 4 includes a ratchet 10 that is integrally connected to the outer surface of the corresponding side frame 2F of the seat back 2, and a guide 20 that is integrally connected to an inner surface of the corresponding side frame 3F of the seat cushion 3. The reclining angle of the seat back 2 is fixed and released by locking and unlocking the relative rotation of the ratchet 10 and the guide 20.

Figure 2:
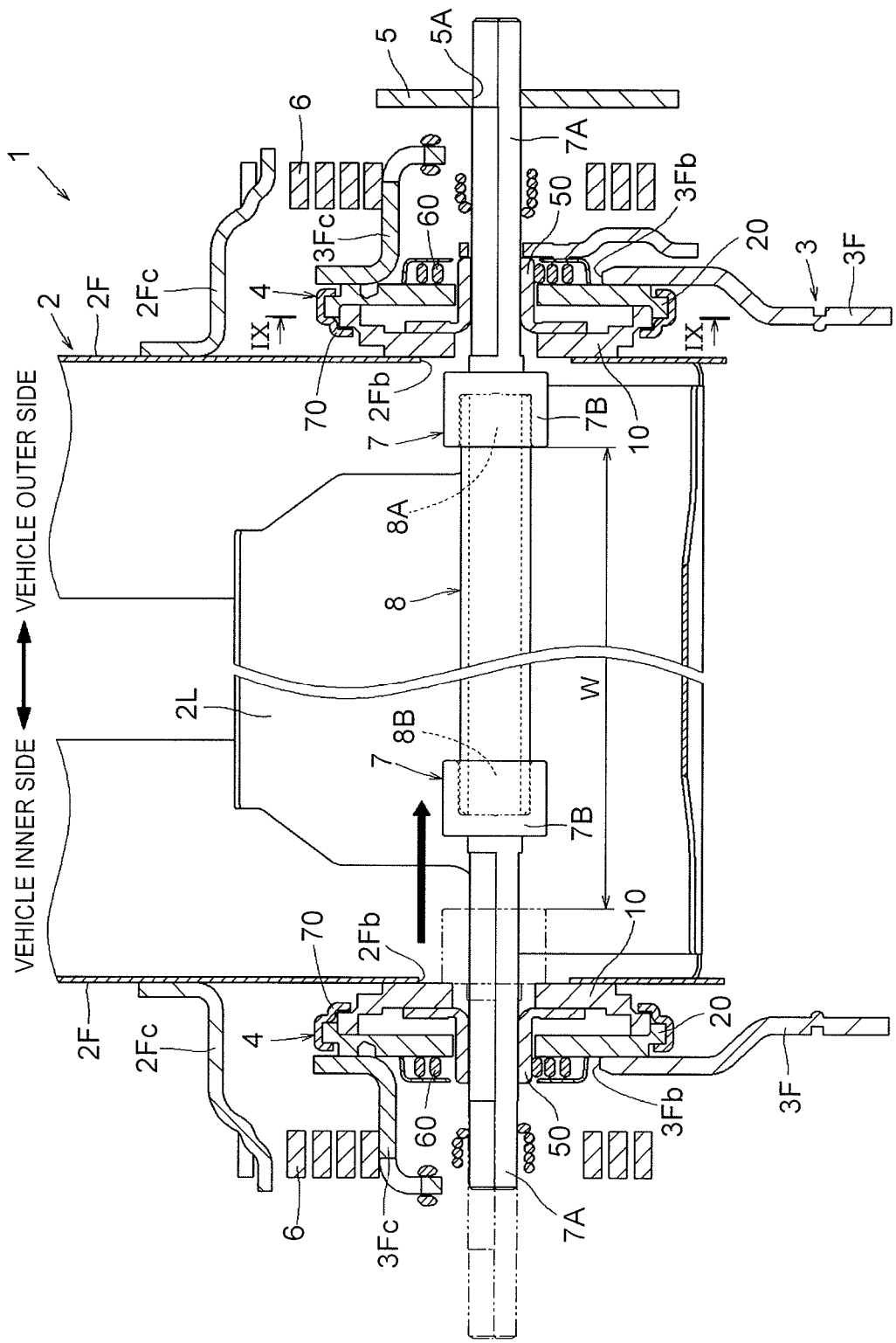
FIG. 2 is a sectional view taken along a line II-II in FIG. 1.

As shown in FIG. 2, the operating pins 7 that respectively unlock the recliners 4 are constituted by components that have the shapes identical to each other. One of the operating pins 7, which is inserted through the recliner 4 on the vehicle outer side, needs to have a large shaft length (in other words, the operating pin 7 needs to have an elongated operating shaft portion 7A described later), because the unlocking lever 5 is fitted to the end portion of the operating pin 7, the end portion being located outside the recliner 4. The other operating pin 7, which is inserted through the recliner 4 on the other side (on the vehicle inner side), does not need to have such a large shaft length, because the unlocking lever 5 is not fitted to the other operating pin 7.

Figure 3:
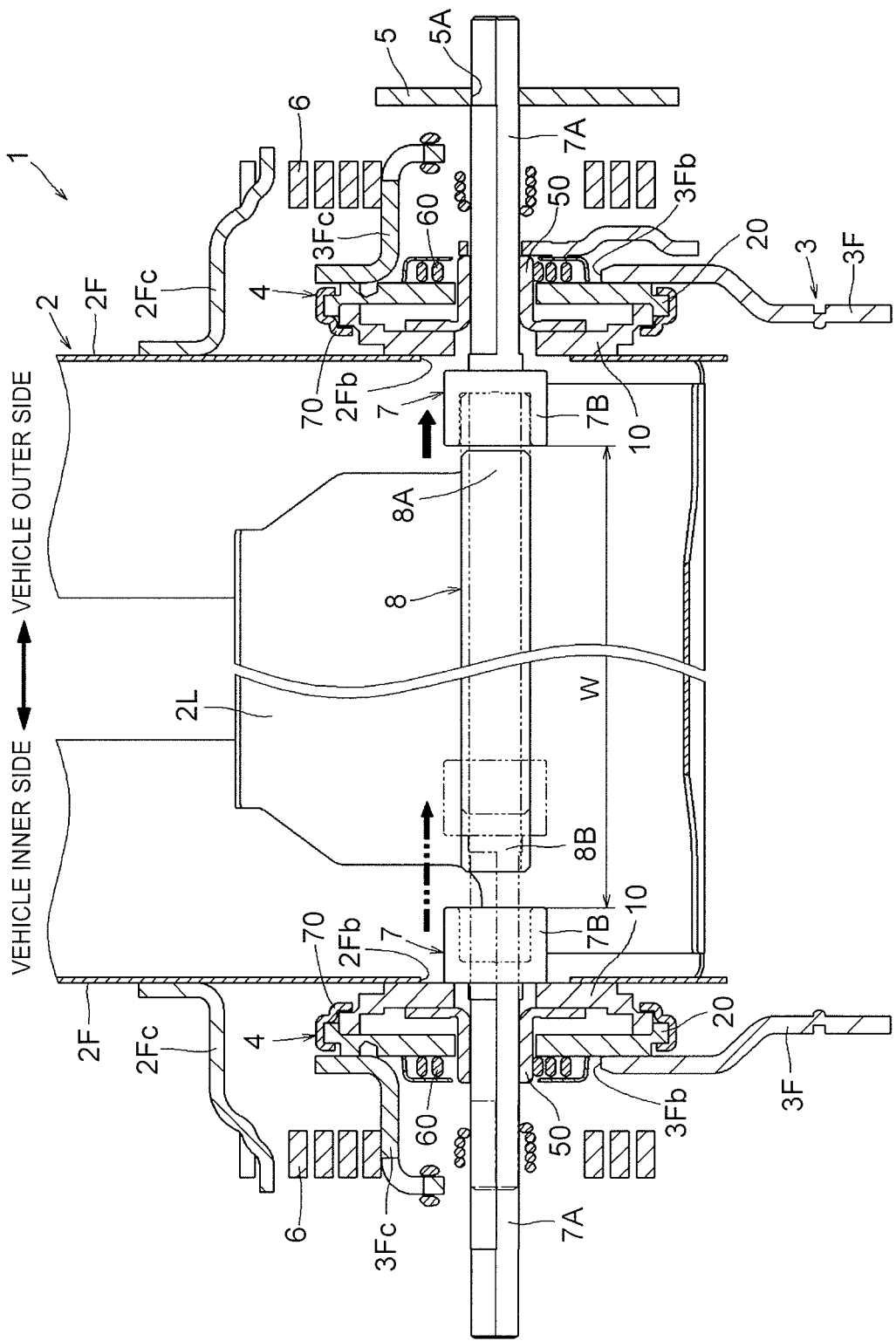
FIG. 3 is a sectional view showing a procedure for fitting operating pins on both sides to a rod.

However, the operating pin 7, which is inserted through the recliner 4 on the other side (on the vehicle inner side), has a large shaft length that would allow the unlocking lever 5 to be fitted to the operating pin 7 (in other words, the operating pin 7 has the elongated operating shaft portion 7A described later). As shown in FIG. 2 and FIG. 3, when the operating pin 7 on the vehicle inner side is fitted to the rod 8, and is connected to the rod 8, an insertion depth of the operating pin 7 with respect to the recliner 4 is reduced (the insertion depth, to which the operating pin 7 is inserted through the recliner 4, is reduced) to connect the operating pin 7 to the rod 8. Thus, finally, the operating pin 7 on the vehicle inner side is disposed in the state where a length, by which the operating pin 7 protrudes outward from the seat, is reduced to a small length.

More specifically, after the side frames 2F of the seat back 2 are integrally connected to the upper frame 2U and the lower plate 2L to form one unit, the operating pins 7 are inserted through the side frames 2F from an inner side such that the operating pins 7 are respectively fitted to inner portions of the recliners 4. After the operating pins 7 are respectively fitted to the recliners 4, the rod 8 is inserted into inner end portions (fitting portions 7B described later) of the operating pins 7 from the inner side in the axial direction to integrally connect the operating pins 7 to each other. Then, the operating pins 7 on the both sides and the rod 8 are integrally connected to each other by welding.

As shown in FIG. 3, each of the operating pins 7 (described in detail later) is inserted through the corresponding side frame 2F from the inner side toward an outer side in the axial direction up to a position (a "second position" according to the invention) in which the operating pin 7 is inserted to the fullest extent. As a result, the operating shaft portions 7A are respectively inserted through the recliners 4, and a width between the fitting portions 7B, to which end portions 8A, 8B of the rod 8 are to be connected, is larger than the shaft length of the rod 8. Thus, after the operating pins 7 are respectively inserted through the recliners 4, the rod 8 can be inserted (disposed) between the fitting portions 7B of the operating pins 7.

At this time, the operating shaft portion 7A of each operating pin 7 is inserted such that a large extra-length portion of the operating shaft portion 7A protrudes outward from the corresponding recliner 4 in the axial direction. The unlocking lever 5 provided to perform an operation for unlocking the recliners 4 is fitted to the extra-length portion at a distal end side of the operating shaft portion 7A of the operating pin 7 on the vehicle outer side, which is inserted through the recliner 4. The extra-length portion at the distal end side of the operating shaft portion 7A of the operating pin 7 on the vehicle inner side functions such that the operating shaft portion 7A remains inserted through the recliner 4 even when the operating pin 7 on the vehicle inner side is moved in a direction in which the operating pin 7 is pulled out from the recliner 4 (i.e., a direction toward the inner side in the axial direction).

Accordingly, as shown in FIG. 3, the end portion 8A of the rod 8 on one side is fitted into the fitting portion 7B of the operating pin 7 on the vehicle outer side, and then, the operating pin 7 on the vehicle inner side is moved in the direction in which the operating pin 7 is pulled out from the recliner 4 and the fitting portion 7B thereof is fitted to the end portion 8B of the rod 8 on the other side. Thus, both of the operating pins 7 can be connected to the rod 8 while the operating shaft portion 7A of the operating pin 7 on the vehicle inner side remains inserted through the recliner 4 on the vehicle inner side. A position, in which the fitting portion 7B of the operating pin 7 on the vehicle inner side is fitted to the end portion 8B of the rod 8, corresponds to a "first position" according to the invention. With the above-mentioned fitting structure, even in the case where a total length of the operating pins 7 and the rod 8 that are connected to each other is larger than a width between the side frames 2F of the seat back 2, the operating pins 7 can be inserted through the side frames 2F and fitted to the side frames 2F (an insertion process) after the side frames 2F are connected to each other to form one unit (a frame assembly process). Further, even in the case where the operating pins 7 are constituted by the components identical to each other, the operating pin 7 on the vehicle inner side, which is not fitted to the unlocking lever 5, can be disposed in the state in which the operating pin 7 does not unnecessarily protrude outward. Thus, the seat 1 can be made compact in the width direction.

Figure 6:
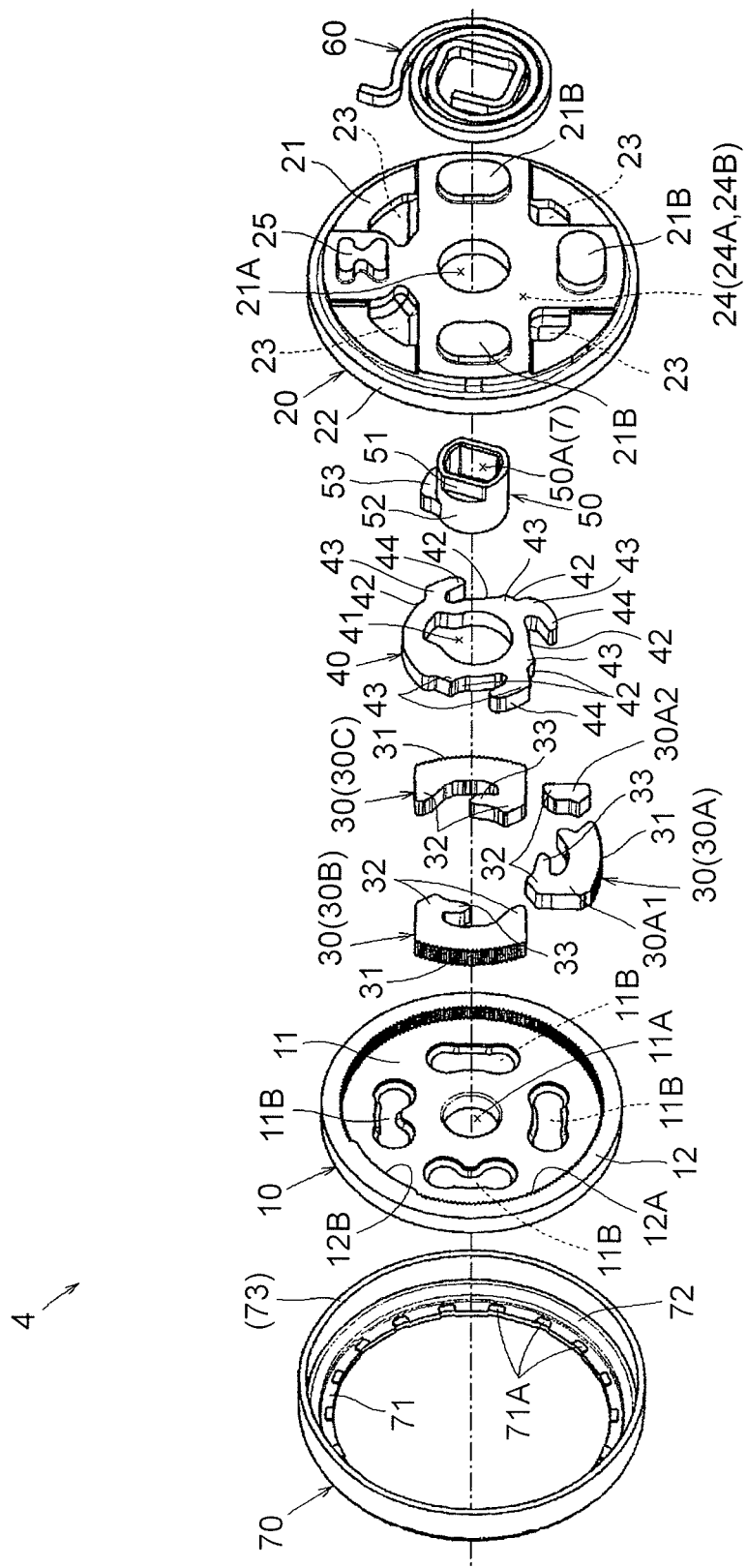
FIG. 6 is an exploded perspective view showing the recliner seen from one side.
Figure 7:
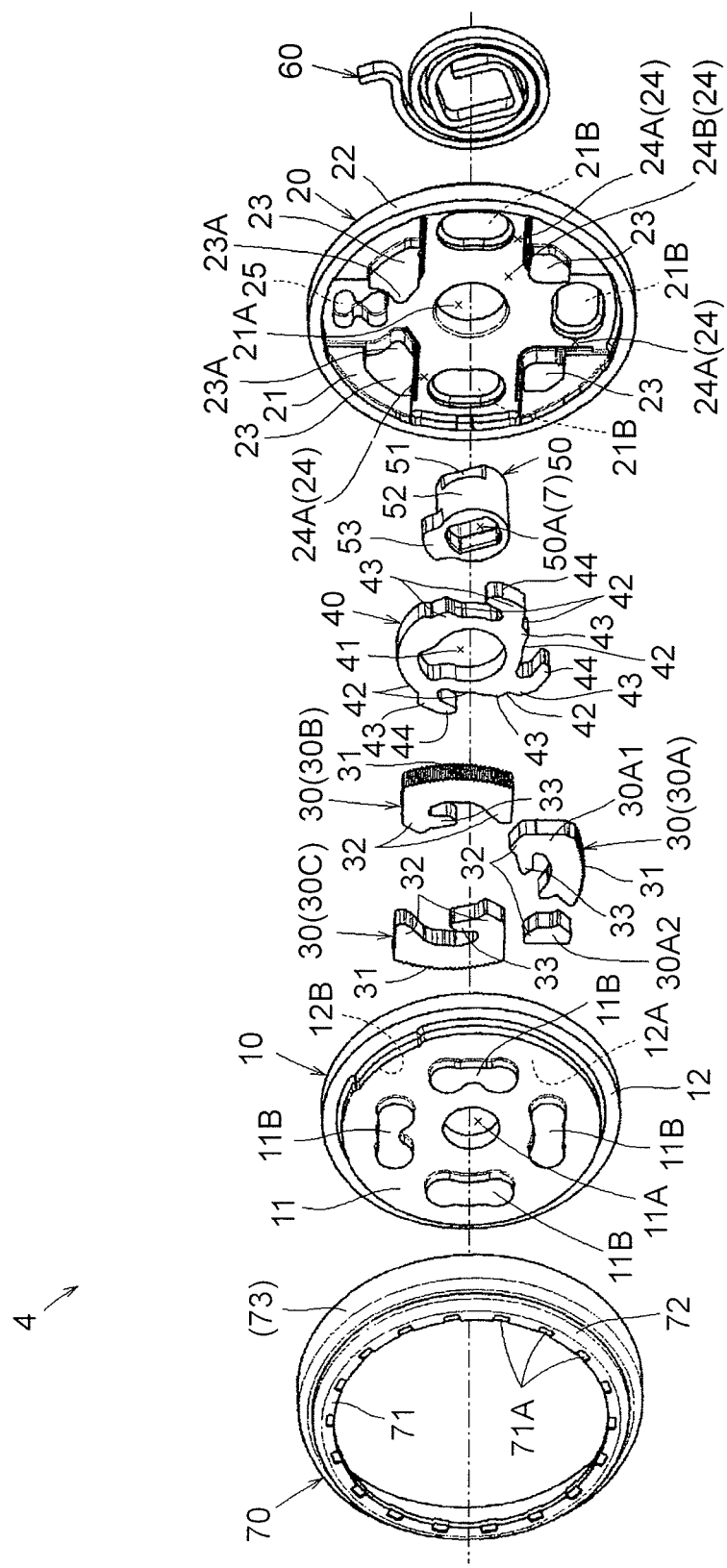
FIG. 7 is an exploded perspective view showing the recliner seen from the other side.

Hereinafter, the structure of each operating pin 7 and the structure of each recliner 4 will be described in detail. Although the recliners 4 are disposed symmetrically to each other, the structures of the recliners 4 are substantially the same. Accordingly, hereinafter, the structure of the recliner 4 provided on the vehicle outer side shown in FIG. 4 and FIG. 5 will be described as a representative example. As shown in FIG. 6 and FIG. 7, the recliner 4 includes the ratchet 10 and the guide 20 that have a disc shape, and that are fitted to each other in the axial direction; three pawls 30 (30A to 30C); a rotary cam 40; a hinge cam 50; a lock spring 60 fitted to an outer surface of the guide 20; and an outer peripheral ring 70 that is mounted over the ratchet 10 and the guide 20. The pawls 30, the rotary cam 40, and the hinge cam 50 are disposed between the ratchet 10 and the guide 20. The outer peripheral ring 70 has a stepped cylindrical shape (in other words, the shape of a cylinder with a stepped portion).

As shown in FIG. 6, the ratchet 10 has a substantially disc shape. In an outer peripheral edge portion of a disc body 11 of the ratchet 10, a cylindrical portion 12 is formed to protrude in a cylindrical shape in the axial direction that is a direction in which the ratchet 10 is fitted to the guide 20. The cylindrical portion 12 is formed by extruding the outer peripheral edge portion of the disc body 11 in a plate thickness direction by half blanking. In an inner peripheral surface of the cylindrical portion 12, an internal tooth row 12A is formed. External tooth rows 31 formed in outer peripheral surfaces of the pawls 30 (described later) are pressed from an inner side in a radial direction to the internal tooth row 12A, and the external tooth rows 31 are engaged with the internal tooth row 12A. The internal tooth row 12A is formed in the substantially entire circumference of the inner peripheral surface region of the cylindrical portion 12. A plurality of internal teeth are arranged at the pitch angle of 2 degrees in a circumferential direction. In the cylindrical portion 12, the internal tooth row 12A is not formed in one region in the circumferential direction. In the one region, an uplifted portion 12B is formed, and the uplifted portion 12B protrudes toward the inner side in the radial direction and forms a smooth arcuate surface. The uplifted portion 12B protrudes toward the inner side in the radial direction further than the internal tooth row 12A. The uplifted portion 12B forms the rotation range called the free zone, in which the pawls 30 are not engaged with the internal tooth row 12A.

Figure 8:
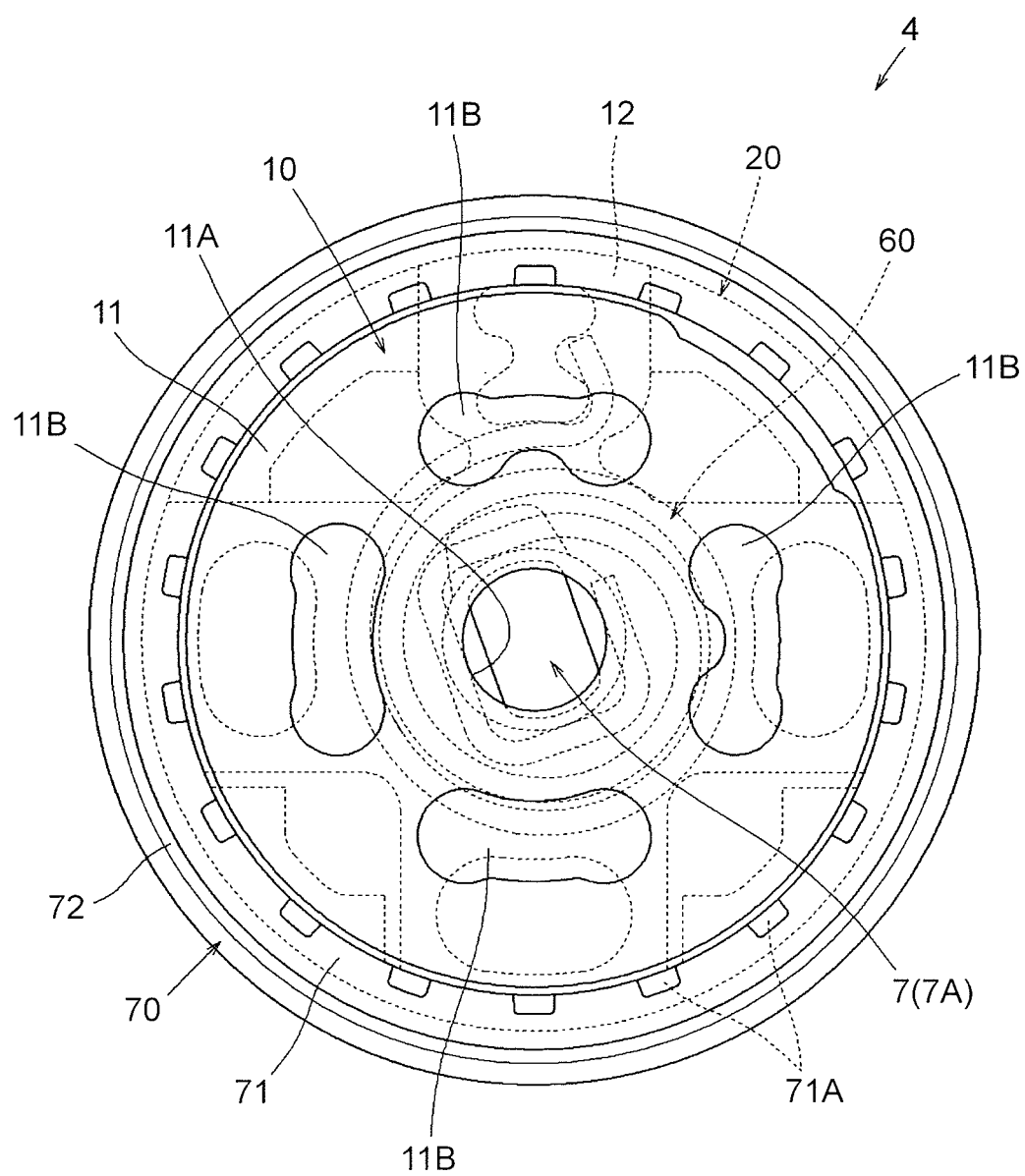
FIG. 8 is a front view showing the recliner from the side of a ratchet.

A through-hole 11A is formed at a center portion of the disc body 11 of the ratchet 10. The through-hole 11A has a round shape and extends through the disc body 11. The operating pin 7, which is inserted through, and fitted to the hinge cam 50 described later, is inserted through the through-hole 11A from the inner side in the axial direction. As shown in FIG. 7 and FIG. 8, in an outer surface of the disc body 11 of the ratchet 10, four dowels 11B, which protrude in an elliptical shape, are arranged at equal intervals in the circumferential direction. The dowels 11B are formed by extruding portions of the disc body 11 of the ratchet 10 in the plate thickness direction by half blanking. As shown in FIG. 4, when the outer surface of the disc body 11 of the ratchet 10 is brought into contact with, and connected to the outer surface of the side frame 2F of the seat back 2, the dowels 11B are respectively fitted into, and integrally connected to four dowel holes 2Fa formed in the side frame 2F by welding. Thus, the dowels 11B function as a connection portion. The side frame 2F of the seat back 2 further has a through-hole 2Fb with a round shape. The operating shaft portion 7A of the operating pin 7 is inserted through the through-hole 2Fb from the inner side to the outer side in the axial direction.

As shown in FIG. 6 and FIG. 7, the guide 20 has a substantially disc shape, and has an outer diameter slightly larger than that of the ratchet 10. In an outer peripheral edge portion of a disc body 21, a cylindrical portion 22 is formed to protrude in a cylindrical shape in the axial direction that is the direction in which the guide 20 is fitted to the ratchet 10. The cylindrical portion 22 has such a size that the cylindrical portion 12 of the ratchet 10 can be loosely fitted into an inner portion of the cylindrical portion 22. The cylindrical portion 12 of the ratchet 10 is fitted into the cylindrical portion 22 of the guide 20. Thus, the cylindrical portion 12 of the ratchet 10 is loosely fitted to the cylindrical portion 22 of the guide 20 such that the cylindrical portion 12 is disposed inside the cylindrical portion 22. In other words, the cylindrical portion 12 of the ratchet 10 and the cylindrical portion 22 of the guide 20 support each other such that the cylindrical portion 12 and the cylindrical portion 22 are rotatable relative to each other. Since the outer peripheral ring 70 (described later) is mounted over the cylindrical portion 22 of the guide 20 and the cylindrical portion 12 of the ratchet 10 from an outer peripheral side, the guide 20 is fitted to the ratchet 10 in the state in which the guide 20 is prevented from separating from the ratchet 10 in the axial direction such that the guide 20 is rotatable relative to the ratchet 10 while the disc-shaped guide 20 and the disc-shaped ratchet 10 slide with respect to each other (refer to FIG. 2 to FIG. 5).

A through-hole 21A is formed at a center portion of the disc body 21 of the guide 20. The through-hole 21A has a round shape, and extends through the disc body 21 of the guide 20. A shaft portion 52 of the hinge cam 50 (described later) is inserted through, and is fitted to the through-hole 21A from the inner side to the outer side in the axial direction such that the shaft portion 52 is rotatable about the axis thereof. As shown in FIG. 6, on the outer surface of the disc body 21 of the guide 20, three dowels 21B that protrude in an elliptical shape are formed at intervals of 90 degrees in the circumferential direction. More specifically, each of the dowels 21B is formed in a corresponding circumferential region in which a corresponding one of three pawl receiving recesses 24A (described later) is formed, on the outer surface of the disc body 21 of the guide 20.

Each of the dowels 21B is formed by extruding a portion of the disc body 21 of the guide 20 in the plate thickness direction by half blanking. As shown in FIG. 5, when the outer surface of the disc body 21 of the guide 20 is brought into contact with, and is connected to the outer surface of the side frame 3F of the seat cushion 3, the dowels 21B are respectively fitted into, and integrally connected to three dowel holes 3Fa formed in the side frame 3F by welding. Thus, the dowels 21B function as a connection portion. The side frame 3F of the seat cushion 3 further has a through-hole 3Fb. The operating shaft portion 7A of the operating pin 7 and the lock spring 60 (described later) fitted to the outer surface of the disc body 21 of the guide 20 are inserted through the through-hole 3Fb from the inner side to the outer side in the axial direction.

As shown in FIG. 7, in the inner surface of the disc body 21 of the guide 20, guide walls 23 are formed at four positions in the circumferential direction. Each of the guide walls 23 protrudes in a fan shape, and protrudes in the axial direction that is the direction in which the guide 20 is fitted to the ratchet 10. Each of the guide walls 23 is formed by extruding a portion of the disc body 21 of the guide 20 in the plate thickness direction by half blanking such that the guide wall 23 has a fan shape that expands toward the outer side in the radial direction. As shown in FIG. 7, since the guide walls 23 are formed, the pawl receiving recesses 24A, in which the three pawls 30 (described later) are respectively housed, are formed in regions among the guide walls 23 in the circumferential direction. Each pawl 30 set in the corresponding pawl receiving recess 24A is supported from both sides in the circumferential direction by the guide walls 23 such that the pawl 30 can be moved only in a radially inward direction and a radially outward direction. Further, since the guide walls 23 are formed, a cam receiving recess 24B is formed in a center region surrounded by the guide walls 23 in the guide 20. The rotary cam 40 (described later) can be housed in the cam receiving recess 24B such that the rotary cam 40 is rotatable about the axis thereof.

Extension portions 23A are respectively formed in the two guide walls 23 on an upper side in the drawings, among the four guide walls 23. The pawl 30 is not disposed between the two guide walls 23 on the upper side. The extension portions 23A contact and support the rotary cam 40 set in the cam receiving recess 24B from the outer peripheral side. Since the rotary cam 40 is supported by the extension portions 23A, the rotary cam 40 supports, from the inner side in the radial direction, the pawls 30 (described later) disposed at three locations that are unevenly positioned in the circumferential direction. Thus, when a reaction force deflected toward an upper side in the drawings is applied, the guide 20 is maintained in the state in which the forces are balanced (refer to FIG. 9).

The three pawl receiving recesses 24A formed among the guide walls 23 in the circumferential direction and the cam receiving recess 24B formed in the center portion of the guide 20 are portions of a guide recess 24 that is relatively recessed by forming the guide walls 23 by extrusion. Thus, the pawl receiving recesses 24A and the cam receiving recess 24B are flush with each other. Thus, the three pawls 30, the rotary cam 40, and the hinge cam 50, which are disposed between the guide 20 and the ratchet 10, are supported by, and fitted to the guide 20.

As shown in FIG. 7, in the outer surface of the disc body 21 of the guide 20, a spring hook portion 25 is formed to protrude. An outer end portion of the lock spring 60 (described later) is engaged with the spring hook portion 25. The spring hook portion 25 is formed by extruding a portion of the disc body 21 of the guide 20 in the plate thickness direction by half blanking. The spring hook portion 25 is formed at a position such that the spring hook portion 25 and the three dowels 21B are disposed at equal intervals, in other words, at intervals of 90 degrees on the outer surface of the disc body 21 (in other words, the spring hook portion 25 and the two dowels 21B adjacent to the spring hook portion 25 are disposed at intervals of 90 degrees). The spring hook portion 25 has a shape having a constricted portion at an intermediate position such that the outer end portion of the lock spring 60 (described later) is engaged with the constricted portion.

Figure 9:
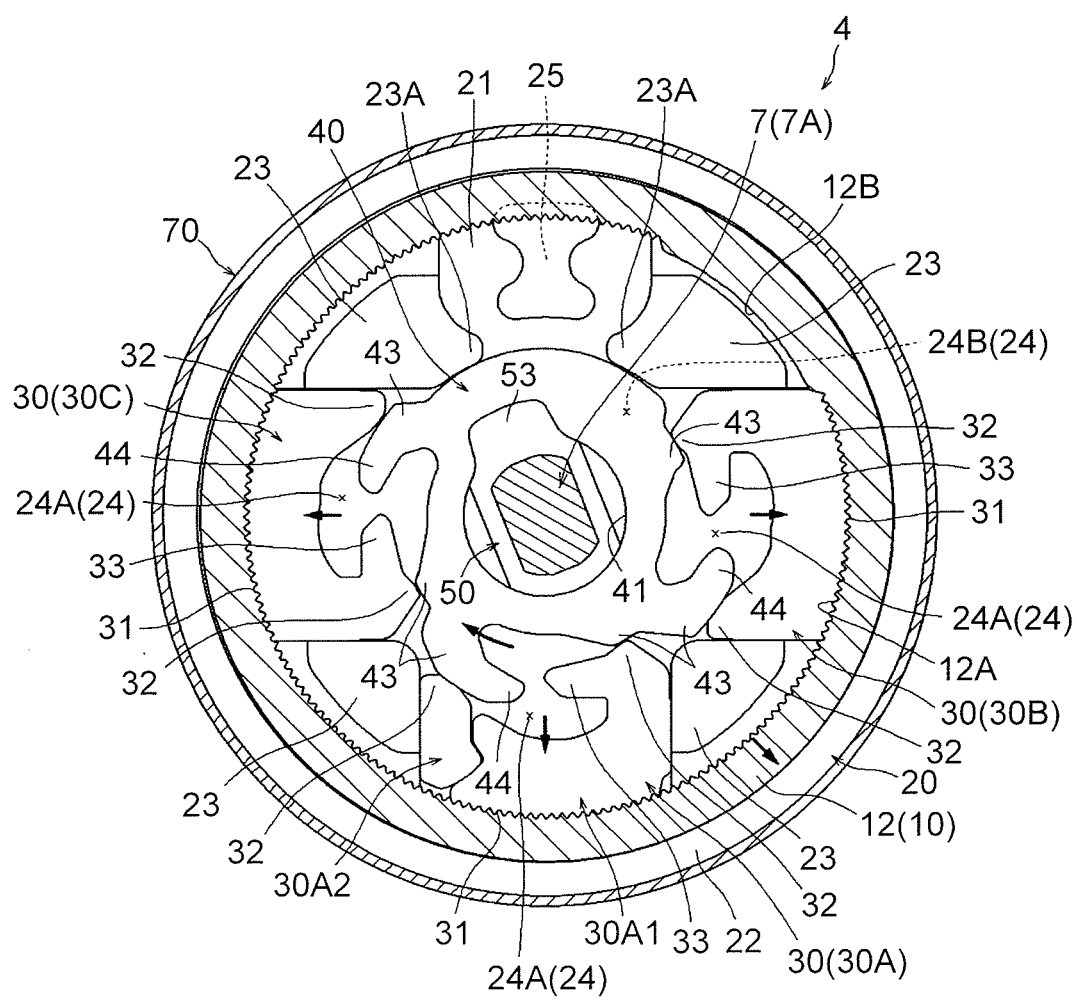
FIG. 9 is a sectional view taken along a line IX-IX in FIG. 2, the sectional view showing the recliner in a locked state.
Figure 10:
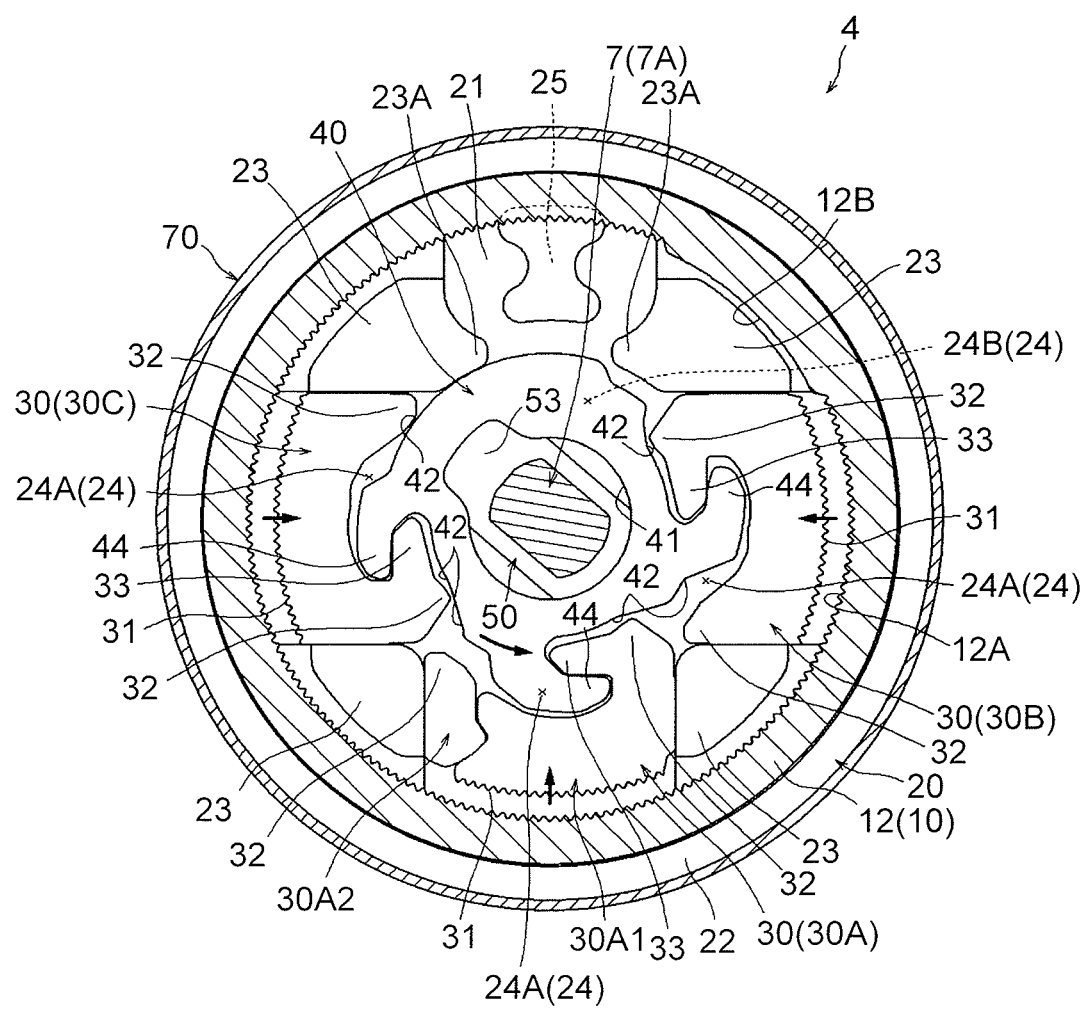
FIG. 10 is a sectional view showing the recliner in an unlocked state.

As shown in FIG. 7 and FIG. 9, the three pawls 30 are respectively housed in, and fitted to the pawl receiving recesses 24A formed in the inner surface of the disc body 21 of the guide 20. Since the pawls 30 are fitted to the pawl receiving recesses 24A, each pawl 30 is supported in the circumferential direction such that the pawl 30 can be moved only in the radially inward direction and the radially outward direction, along the shape of the corresponding pawl receiving recess 24A. As shown in FIG. 9 to FIG. 10, each pawl 30 is housed in the corresponding pawl receiving recess 24A, and the internal tooth row 12A formed on the inner peripheral surface of the cylindrical portion 12 of the ratchet 10 is exposed at a position to which the pawl 30 moves in the radially outward direction.

As shown in FIG. 6 and FIG. 7, the external tooth row 31, which can be engaged with the internal tooth row 12A of the ratchet 10, is formed on the outer peripheral surface of each pawl 30. The external tooth row 31 is formed by disposing a plurality of external teeth at the pitch angle of 2 degrees in the circumferential direction on the outer peripheral surface of each pawl 30, which is curved to form an arcuate surface. As shown in FIG. 9 and FIG. 10, when the rotary cam 40 that is set in the center portion of the guide 20 is rotated about the axis thereof, each pawl 30 is pushed toward the outer side in the radial direction (refer to FIG. 9) or pulled toward the inner side in the radial direction (refer to FIG. 10) by the rotary cam 40.

As shown in FIG. 9, when the pawls 30 are pushed toward the outer side in the radial direction due to the rotation of the rotary cam 40, the external tooth rows 31 formed on the outer peripheral surfaces of the pawls 30 are pressed to, and engaged with the internal tooth row 12A of the ratchet 10. Thus, the pawls 30 are engaged with the ratchet 10 in a rotational direction to be integrally connected to the ratchet 10, and thus, the relative rotation of the ratchet 10 and the guide 20 is locked (inhibited) via the pawls 30. That is, the pawls 30 are supported by the guide walls 23 in the circumferential direction, and thus, the pawls 30 can be moved only in the radially inward direction and the radially outward direction, in the relation between the pawls 30 and the guide 20. Therefore, when the pawls 30 are engaged with the ratchet 10 in the rotational direction to be integrally connected to the ratchet 10, the pawls 30 function so as to lock (inhibit) the rotation of the ratchet 10 relative to the guide 20.

As shown in FIG. 10, when the pawls 30 are pulled back toward the inner side in the radial direction due to the rotation of the rotary cam 40, the pawls 30 are disengaged from the internal tooth row 12A of the ratchet 10. Thus, the state, in which the relative rotation of the ratchet 10 and the guide 20 is locked (inhibited), is canceled. Accordingly, the state of the recliner 4 is switched to the state in which the ratchet 10 and the guide 20 can be rotated relative to each other. Each pawl 30 includes two leg portions 32 extending toward the inner side in the radial direction, and thus, the pawl 30 has a U-shape. An engaging portion 33 protrudes from one of the leg portions 32 to an inner portion of the U-shape.

As shown in FIG. 9, when the leg portions 32 of the pawls 30 are pressed by the rotary cam 40 from the inner side in the radial direction due to the rotation of the rotary cam 40, the pawls 30 are pushed toward the outer side in the radial direction. Further, as shown in FIG. 10, when the rotary cam 40 is rotated in a direction opposite to a direction in which the rotary cam 40 is rotated in the above-mentioned case, the engaging portions 33 of the pawls 30 are pulled toward the inner side in the radial direction by hooks 44 of the rotary cam 40, and the pawls 30 are pulled back toward the inner side in the radial direction.

As described above with reference to FIG. 9, the rotary cam 40 is housed in, and fitted to the cam receiving recess 24B formed in the inner surface of the disc body 21 of the guide 20. The rotary cam 40 is supported by the hinge cam 50 (described later) to be rotatable about the axis thereof with respect to the guide 20. The hinge cam 50 is inserted into, and fitted to a center portion of the rotary cam 40. The rotary cam 40 has a thickness that is substantially the same as the thickness of the pawls 30. When the rotary cam 40 is housed in the cam receiving recess 24B (refer to FIG. 7), the rotary cam 40 is located at the same position as the position of the pawls 30 in the axial direction.

As shown in FIG. 9 and FIG. 10, recess portions 42, shoulder portions 43, and the hooks 44 are formed on surfaces in right and left sides and a lower side of the rotary cam 40 in the drawings. The leg portions 32 of the pawls 30 can respectively move into the recess portions 42. When the rotary cam 40 is rotated, the leg portions 32 of the pawls 30, which have moved into the recess portions 42, are caused to ride on the shoulder portions 43 such that the leg portions 32 are pushed toward the outer side in the radial direction. When the rotary cam 40 is rotated in the opposite direction, the hooks 44 are engaged with the engaging portions 33 of the pawls 30, and the hooks 44 pull the pawls 30 toward the inner side in the radial direction.

An operating portion 53 of the hinge cam 50 (described later) is axially fitted into a through-hole 41 formed at a center portion of the rotary cam 40 such that the hinge cam 50 and the rotary cam 40 are rotatable together in the rotational direction. More specifically, the through-hole 41 has a hook hole-shape, and the hook-shaped operating portion 53 of the hinge cam 50 is fitted into the through-hole 41 such that the hinge cam 50 and the rotary cam 40 are rotatable together in the rotational direction. Since the operating portion 53 of the hinge cam 50 is fitted into the through-hole 41 of the rotary cam 40 in the above-mentioned manner, when the hinge cam 50 is rotated about the axis thereof toward one side or the other side in the rotational direction, the rotary cam 40 is rotated together with the hinge cam 50.

As shown in FIG. 9, the hinge cam 50 is normally urged in the clockwise direction in the drawing by the lock spring 60 (described later), and thus, the rotary cam 40 is normally maintained in the state in which the rotary cam 40 is pushed in the clockwise direction. Thus, the shoulder portions 43, which are formed on the surfaces in the right and left sides and the lower side of the rotary cam 40, push the leg portions 32 of the pawls 30 toward the outer side in the radial direction. Accordingly, the pawls 30 are engaged with the internal tooth row 12A of the ratchet 10, and thus, the rotation of the recliner 4 is kept locked.

When the unlocking lever 5 (refer to FIG. 1) is pulled up, the hinge cam 50 is rotated about the axis thereof in a direction opposite to the above-mentioned direction in which the hinge cam 50 is urged, and thus, the rotary cam 40 is rotated in the counter-clockwise direction by the operating portion 53 of the hinge cam 50 as shown in FIG. 10. Thus, the recess portions 42 formed on the surfaces in the right and left sides and the lower side of the rotary cam 40 move to positions directly under the leg portions 32 of the pawls 30 (i.e., positions inside the leg portions 32 in the radial direction), and the hooks 44 extending from the surfaces are gradually engaged with the engaging portions 33 of the pawls 30. Accordingly, the hooks 44 pull the pawls 30 toward the inner side in the radial direction, and thus, the pawls 30 are disengaged from the ratchet 10. Thus, the recliner 4 is unlocked. Further, when the unlocking lever 5 is returned, the rotary cam 40 is again rotated in the clockwise direction in the drawings, by the operating portion 53 of the hinge cam 50 that is rotated due to the urging force of the lock spring 60. Accordingly, the recliner 4 is brought back to the state in which the pawls 30 are engaged with the internal tooth row 12A of the ratchet 10 (the rotation of the recliner 4 is locked).

Among the three pawls 30 (30A to 30C), a pawl 30A located in a pawl receiving recess 24A on the lower side in FIG. 9 and FIG. 10 includes a first piece 30A1 and a second piece 30A2 that are formed by obliquely splitting the pawl 30A into two pieces adjacent to each other in the circumferential direction. With this configuration, as shown in FIG. 9, when the pawl 30A is pushed from the inner side toward the outer side by the rotary cam 40 such that the external tooth row 31 thereof is engaged with the internal tooth row 12A of the ratchet 10, the first piece 30A1 and the second piece 30A2 are pressed apart, in other words, the first piece 30A1 and the second piece 30A2 are pressed to the guide walls 23 on the right and left sides of the first piece 30A1 and the second piece 30A2. This suppresses backlash in the circumferential direction.

As shown in FIG. 6 and FIG. 7, the hinge cam 50 includes a spring hook portion 51 having a rectangular tubular shape, a shaft portion 52 that has a cylindrical shape, and the operating portion 53 including a rectangular-shaped portion that is provided at a location in a circumferential direction of the operating portion 53 to protrude toward the outer side in the radial direction. The spring hook portion 51, the shaft portion 52, and the operating portion 53 are arranged in the axial direction. Thus, the hinge cam 50 is configured as a shaft member. A through-hole 50A is formed at a center portion of the hinge cam 50 to extend through the hinge cam 50. The cross-section of the through-hole 50A is elliptic (oval). The spring hook portion 51 and the shaft portion 52 of the hinge cam 50 are inserted into the through-hole 21A formed at the center portion of the guide 20, from the inner side in the axial direction. Thus, the hinge cam 50 is fitted to the guide 20 in a position in which the operating portion 53 contacts and engages with the inner surface of the disc body 21 of the guide 20 in the state in which the spring hook portion 51 protrudes outward from the guide 20 in the axial direction, and the shaft portion 52 is fitted in the through-hole 21A of the guide 20 to be rotatable about the axis thereof.

The hinge cam 50 is in the state in which the inner end portion of the lock spring 60, which is wound in a rectangular shape, is fitted onto, and engaged with a rectangular outer peripheral portion of the spring hook portion 51 that protrudes outward from the guide 20 in the axial direction, and thus, the lock spring 60 and the spring hook portion 51 are rotatable together in the rotational direction. As shown in FIG. 5, the lock spring 60 is constituted by a spiral spring, and is disposed on the outer surface of the guide 20. The inner end portion of the lock spring 60 is engaged with the spring hook portion 51 of the hinge cam 50, and the outer end portion of the lock spring 60 is engaged with the spring hook portion 25 that is formed on the outer surface of the guide 20 to protrude. Thus, the lock spring 60 normally applies the urging force that rotates the hinge cam 50 with respect to the guide 20 in a direction in which the rotary cam 40 performs the locking operation.

Figure 11:
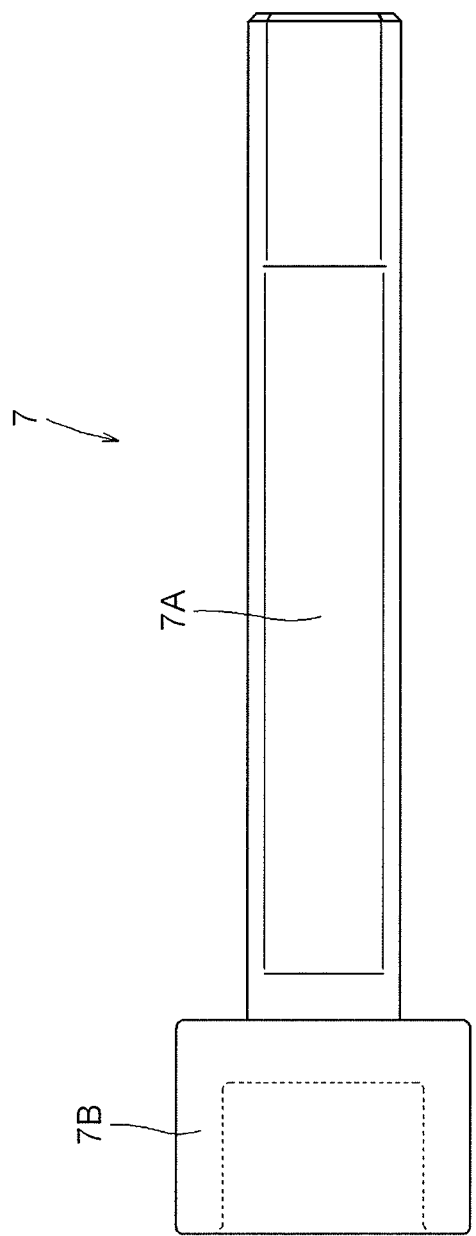
FIG. 11 is a front view showing one operating pin.

As shown in FIG. 6 and FIG. 7, the operating pin 7 that rotates the hinge cam 50 about the axis thereof is inserted through the through-hole 50A at the center portion of the hinge cam 50 disposed between the ratchet 10 and the guide 20. The operating pin 7 is inserted through the through-hole 50A from the inner side to the outer side in the axial direction such that the operating pin 7 and the hinge cam 50 are rotatable together in the rotational direction. As described above, the operating pin 7 inserted through the recliner 4 on the vehicle outer side and the operating pin 7 inserted through the recliner 4 on the vehicle inner side are constituted by the components identical to each other. More specifically, as shown in FIG. 6, FIG. 7, and FIG. 11, each operating pin 7 includes the operating shaft portion 7A that is inserted through, and connected to the recliner 4 from the inner side in the axial direction, and the fitting portion 7B that is fitted to, and connected to the end portion 8A or 8B of the rod 8. The operating shaft portion 7A and the fitting portion 7B are coaxially located. The fitting portion 7B corresponds to a "connection portion" and a "restriction portion" according to the invention.

The operating shaft portion 7A has the elliptic (oval) cross-sectional shape that is the same as that of the through-hole 50A of the hinge cam 50 of the recliner 4. The operating shaft portion 7A uniformly extends in the axial direction. Thus, the operating shaft portion 7A is inserted through, fitted into, and connected to the through-hole 50A of the hinge cam 50 in the axial direction such that the operating shaft portion 7A and the hinge cam 50 are rotatable together in the rotational direction. The fitting portion 7B has a cylindrical shape that is opened toward the inner side in the axial direction. The fitting portion 7B has the outer diameter slightly larger than that of the operating shaft portion 7A. The end portion 8A or 8B of the rod 8 having a circular tubular shape is fitted into the fitting portion 7B having the cylindrical shape. More specifically, the fitting portion 7B has such a shape that the end portion 8A or 8B of the rod 8 can be fitted into the fitting portion 7B in the state in which the end portion 8A or 8B is rotatable in the fitting portion 7B.

After the end portions 8A, 8B are fitted into the fitting portions 7B having the cylindrical shape, welding is performed on fitted portions of the end portions 8A, 8B and the fitting portions 7B such that the fitting portions 7B are integrally connected to the rod 8. As described above, each fitting portion 7B is configured such that the end portion 8A or 8B can be fitted into the fitting portion 7B in the state in which the end portion 8A or 8B is rotatable in the fitting portion 7B. Therefore, when the operating shaft portion 7A of each operating pin 7 is inserted through, and fitted to the through-hole 50A of the hinge cam 50, the backlash between the operating shaft portion 7A and the through-hole 50A in the rotational direction is reduced, and thus, the fitting portion 7B can be integrally connected to the rod 8 in the state in which the backlash between the operating shaft portion 7A and the through-hole 50A in the rotational direction is reduced. Since the operating pins 7 are integrally welded to the rod 8 in the state in which the backlash in the rotational direction is reduced, the operating pins 7 are connected to the rod 8 in the state in which there is no deviation between the operation positions of the operating pins 7 on the right and left sides.

More specifically, after the operating pins 7 are respectively inserted through the recliners 4 on the both sides from the inner side in the axial direction, the operating pins 7 are integrally connected to each other via the rod 8. That is, the operating shaft portion 7A of each of the operating pins 7 is inserted through the through-hole 2Fb of the corresponding side frame 2F of the seat back 2, and is inserted through the through-hole 50A at the center portion of the hinge cam 50 of the corresponding recliner 4 (an insertion process). The movement of the operating shaft portion 7A of each of the operating pins 7 in an insertion direction is restricted up to a restriction position where the fitting portion 7B, which is inserted through the through-hole 2Fb in the corresponding side frame 2F of the seat back 2, contacts the outer surface of the corresponding recliner 4 (the restriction position corresponds to the "second position" according to the invention). When each of the operating pins 7 is inserted up to the restriction position (the second position), the operating shaft portion 7A extends through the corresponding recliner 4, and the large extra-length portion of the operating shaft portion 7A protrudes outward from the recliner 4 in the axial direction (refer to FIG. 3).

As a result, a width W between the fitting portions 7B of the operating pins 7 becomes larger than the shaft length of the rod 8. Thus, it becomes possible to insert (dispose) the rod 8 in a clearance between the fitting portions 7B of the operating pins 7. Then, the rod 8 is inserted (disposed) in the clearance between the fitting portions 7B, and the end portion 8A in one side of the rod 8 is inserted into the fitting portion 7B of the operating pin 7 on the vehicle outer side (a connection process). As a result, a clearance in the axial direction is formed between the end portion 8B in the other side of the rod 8 and the fitting portion 7B of the operating pin 7 on the vehicle inner side. The clearance in the axial direction allows the fitting portion 7B to be pulled toward the inner side in the axial direction and to be fitted to the end portion 8B of the rod 8.

Accordingly, the operating pin 7 on the vehicle inner side is moved in the direction in which the operating pin 7 is pulled out from the recliner 4 on the vehicle inner side, and the fitting portion 7B is fitted to the end portion 8B in the other side of the rod 8 (a slide connection process). As a result, the end portions 8A, 8B of the rod 8 are respectively fitted in the fitting portions 7B of both of the operating pins 7. Thus, the operating pins 7 and the rod 8 are connected to each other in the axial direction. The operating pin 7 on the vehicle inner side is inserted through the recliner 4 on the vehicle inner side in the state in which the large extra-length portion of the operating shaft portion 7A protrudes outward from the recliner 4 in the axial direction. Therefore, when the fitting portion 7B is moved toward the inner side in the axial direction up to the position in which the fitting portion 7B is fitted to the end portion 8B of the rod 8 (the position corresponds to the "first position" according to the invention) as described above, the length of the extra-length portion is reduced to a small length, and the operating shaft portion 7A does not fall off the recliner 4 on the vehicle inner side, that is, the operating shaft portion 7A remains inserted in the recliner 4.

After the fitting portions 7B of the operating pins 7 are fitted to the end portions 8A, 8B of the rod 8, welding is performed on the fitted portions of the fitting portions 7B and the end portions 8A, 8B, and thus, the operating pins 7 are integrally connected to each other via the rod 8. The unlocking lever 5 provided to perform the operation for unlocking the recliners 4 is fitted, from the outer side, to the distal end portion of the operating shaft portion 7A of the operating pin 7 on the vehicle outer side in the state in which the distal end portion of the operating shaft portion 7A protrudes outward from the recliner 4 on the vehicle outer side, to a large extent. The unlocking lever 5 is integrally welded to the distal end portion of the operating shaft portion 7A of the operating pin 7. More specifically, an insertion hole 5A is formed in a proximal end portion of the unlocking lever 5. The insertion hole 5A has an elliptical (oval) cross-sectional shape that is the same as that of the operating shaft portion 7A of the operating pin 7. The operating shaft portion 7A is inserted through the insertion hole 5A such that the unlocking lever 5 and the operating shaft portion 7A are rotatable together in the rotational direction. Further, welding is performed on fitted portions of the operating shaft portion 7A and the insertion hole 5A, and thus, the unlocking lever 5 is integrally connected to the distal end portion of the operating shaft portion 7A.

As shown in FIG. 6 and FIG. 7, the outer peripheral ring 70 is formed to have the stepped cylindrical shape (in other words, the shape of a cylinder with a stepped portion), by stamping a thin steel plate into the shape of a ring, and performing a drawing process, in the plate thickness direction, on an outer peripheral portion of a disc portion formed by stamping. More specifically, an inner peripheral portion of the stepped portion is half-blanked in the axial direction with respect to an outer peripheral portion of the stepped portion. Thus, a first pressing portion 71 that contacts the cylindrical portion 12 of the ratchet 10 from the outer side in the axial direction is formed in the inner peripheral portion of the stepped portion, and a second pressing portion 72 that contacts the cylindrical portion 22 of the guide 20 from the inner side in the axial direction is formed in the outer peripheral portion of the stepped portion.

In the outer peripheral ring 70 having the cylindrical shape, the ratchet 10 and the guide 20 are sequentially fitted and set in the axial direction. Thus, the first pressing portion 71 contacts the cylindrical portion 12 of the ratchet 10 from the outer side in the axial direction, and the second pressing portion 72 contacts the cylindrical portion 22 of the guide 20 from the inner side in the axial direction. As a result, the outer peripheral ring 70, which has the cylindrical shape, in other words, the ring shape, is mounted over the outer peripheral portions of the ratchet 10 and the guide 20. A distal portion (a swaging portion 73) of a cylindrical portion of the outer peripheral ring 70 is swaged to be bent toward the inner side in the radial direction using the second pressing portion 72 as a supporting point. Thus, swaging is performed such that the cylindrical portion 22 of the guide 20 is sandwiched between the swaging portion 73 and the second pressing portion 72, and thus, the outer peripheral ring 70 is integrally fitted to the guide 20.

As a result, in the outer peripheral ring 70, the first pressing portion 71 faces an outer surface of the cylindrical portion 12 of the ratchet 10 in the axial direction. Thus, the outer peripheral ring 70 maintains the ratchet 10 such that the ratchet 10 is rotatable with respect to the guide 20, and the ratchet 10 is prevented from falling off in the axial direction. A plurality of protruding portions 71A are arranged at equal intervals in the circumferential direction on an edge portion of an inner surface of the first pressing portion 71 of the outer peripheral ring 70, the inner surface facing the outer surface of the cylindrical portion 12. The protruding portions 71A are formed to protrude, by half blanking in the axial direction. Since the protruding portions 71A are provided, the outer peripheral ring 70 supports the ratchet 10 in a substantially point-contact manner. Thus, when the ratchet 10 is rotated, a resistance force due to sliding friction is unlikely to be caused at a contact portion between the outer peripheral ring 70 and the ratchet 10.

As described above, the seat 1 in the embodiment has the following configuration. The seat 1 in the embodiment includes the paired right and left recliners 4 that respectively connect the right and left side frames 2F of the seat back 2 to the base (the seat cushion 3) on or above the floor; the operating pins 7 that are respectively inserted through the recliners 4 in the axial direction and are rotated about the axes thereof to respectively unlock the recliners 4; and the rod 8 that integrally connects the operating pins 7 to each other. One of the operating pins 7 (the operating pin 7 on the vehicle inner side) includes the operating shaft portion 7A that is inserted through the recliner 4 on the vehicle inner side from the inner side in the axial direction and is connected to the recliner 4; and the connection portion (the fitting portion 7B) that contacts the rod 8 and is connected to the rod 8, the operating shaft portion 7A and the connection portion (the fitting portion 7B) being arranged in the axial direction. The insertion depth of the operating shaft portion 7A with respect to the recliner 4 is able to be changed (the insertion depth, to which the operating shaft portion 7A is inserted through the recliner 4, is able to be changed) by moving the operating shaft portion 7A between the first position (the position shown in FIG. 2) in which the connection portion (the fitting portion 7B) contacts the rod 8 so as to be connectable to the rod 8, and the second position (the position shown in FIG. 3) in which the connection portion (the fitting portion 7B) is away from the rod 8 in the axial direction. The operating shaft portion 7A is connected to the recliner 4 so as to operate the recliner 4, in the first position (the position in FIG. 2).

Thus, the insertion depth of one of the operating pins 7 (the operating pin 7 on the vehicle inner side) with respect to the recliner 4 is able to be changed by moving the operating pin 7 between the first position (the position shown in FIG. 2) and the second position (the position shown in FIG. 3). Therefore, after the side frames 2F are integrally connected to each other, the operating pins 7 for the recliners 4 can be respectively inserted through the side frames 2F from the seat inner side, and the rod 8 can be inserted (disposed) between the operating pins 7 to connect the operating pins 7.

Further, one of the operating pins 7 (the operating pin 7 on the vehicle inner side) includes the restriction portion (the fitting portion 7B) that restricts the movement of the operating shaft portion 7A with respect to the recliner 4 in the axial direction, up to the second position (the position shown in FIG. 3). With this configuration, the restriction portion (the fitting portion 7B) prevents the operating pin 7 (the operating pin 7 on the vehicle inner side) from falling off the recliner 4 toward the outside of the seat. Thus, it is possible to easily perform the fitting operation.

As described above, the operating pins 7 are constituted by the components that are identical to each other. One of the operating pins 7 (the operating pin 7 on the vehicle inner side) is able to be moved between the first position (the position shown in FIG. 2) in which the operating pin 7 contacts the rod 8 so as to be connectable to the rod 8, and the second position (the position shown in FIG. 3) in which the operating pin 7 is away from the rod 8 in the axial direction. In contrast, the other operating pin 7 (the operating pin 7 on the vehicle outer side) is connected to the rod 8 in the state in which the operating pin 7 is inserted through the recliner 4 to the insertion depth corresponding to the second position. The unlocking lever 5 provided to perform the operation for unlocking the recliners 4 is fitted to the extra-length portion of the operating shaft portion 7A, the extra-length portion protruding from the recliner 4 to the outside of the seat.

With the above-mentioned configuration, even in the case where one of the operating pins 7 (the operating pin 7 on the vehicle inner side) and the other operating pin 7 (the operating pin 7 on the vehicle outer side) are constituted by the components that are identical to each other, each of the operating pins 7 does not include a region that unnecessarily protrudes from the recliner 4 to the outside of the seat. Accordingly, the seat 1 can be made compact in the width direction.

Although the embodiment of the invention is described above, the invention may be implemented in other embodiments. For example, the recliner in the invention may be applied to seats of an automobile other than a passenger's seat. In addition, the recliner in the invention may be widely applied to seats used in various vehicles such as a train, an aircraft, and a vessel. The base to which the seat back is connected may be, for example, a bracket member provided on or above the floor, instead of the seat cushion provided on or above the floor.

The recliner may have the configuration in which the pawls are pressed to, and moved away from the flanks of the internal teeth of the ratchet by a slide cam, instead of the rotary cam that is rotated together with the hinge cam, the slide cam being operated to slide in a specific radial direction due to the rotation of the hinge cam about the axis thereof. The number of the pawls may be two, or four or more. The recliner is not limited to the recliner that is unlocked by the manual operation in the embodiment. The recliner may have the configuration where an internal gear and an external gear are rotated relative to each other in a manner in which the engagement position thereof is changed when an operating pin inserted through the internal gear and the external gear is rotated about the axis thereof, as described in Japanese Patent Application Publication No. 2010-187906 (JP 2010-187906A). An unlocking lever or a drive mechanism may be connected to a location in the operating pin or a rod connected to the operating pin and the other operating pin, and the operating pins may be rotated about the axes thereof so as to operate the recliners, by a manual operation or an electric operation.

The cross-sectional shape of the operating shaft portion of the operating pin is not limited to an elliptic shape in the embodiment. The operating shaft portion may have various shapes such as a polygonal shape, as long as the operating shaft portion can be inserted through each recliner in the axial direction such that the operating shaft portion can be rotated about the axis thereof so as to operate the recliner. The invention is not limited to the configuration in which after the connection portion of the operating pin is fitted to the rod, the operating pin is integrally connected to the rod such that the operating pin and the rod are rotatable together in the rotational direction, by performing welding. The connection portion of the operating pin may be fitted to the rod such that the operating pin and the rod are rotatable together in the rotational direction. The rod does not necessarily need to be fitted into the connection portion of the operating pin, as long as the connection portion of the operating pin contacts the rod and is connected to the rod.

The cross-sectional shape of the operating shaft portion may be any shape, as long as the operating shaft portion can be connected to the recliner in the state in which the operating shaft portion can be rotated about the axis thereof so as to operate the recliner, at least in the first position in which the connection portion contacts the rod so as to be connectable to the rod. The cross-sectional shape of the operating shaft portion does not necessarily need to be uniform in the axial direction. However, in the case where the operating pins on the right and left sides are constituted by the components that are identical to each other, and the other operating pin is connected to the rod in the state in which the other operating pin is inserted through the recliner to the insertion depth corresponding to the second position, the operating shaft portion of each of the operating pins needs to have such a shape that the operating shaft portion can be connected to the recliner in the state in which the operating shaft portion can be rotated about the axis thereof so as to operate the recliner, in each of the first position and the second position.

An inner side portion of each of the side frames in the right and left sides of the seat back may be connected to the base on or above the floor via the recliner, instead of connecting an outer side portion of each of the side frames to the base. The operating pins may be respectively inserted through the recliners in the axial direction and fitted to the recliners before the side frames in the right and left sides of the seat back are fitted to each other to form one unit.

In the above-mentioned embodiment, the connection portion (the fitting portion) has a shape that is larger than the operating shaft portion in the radial direction, and thus, the restriction portion is constituted by the connection portion (the fitting portion). However, in the case where the connection portion has a diameter smaller than that of the operating shaft portion, a restriction portion that is larger than the operating shaft portion in the radial direction may be provided between the connection portion and the operating shaft portion.

What is claimed is:

1. A vehicle seat comprising:
    paired right and left recliners that respectively connect side frames in right and left sides of a seat back to a base that is provided one of on and above a floor;
    operating pins that are respectively inserted through the recliners in an axial direction, and are configured to rotate about axes thereof to respectively unlock the recliners; and
    a rod that is configured to integrally connect the operating pins to each other, wherein
    one of the operating pins includes:
        an operating shaft portion that is inserted through one of the recliners from a seat inner side in the axial direction and is connected to the one recliner; and
        a connection portion that is configured to contact and connect to the rod,
    the operating shaft portion and the rod are arranged in the axial direction, an insertion depth of the operating shaft portion with respect to the one recliner is configured to change, by sliding the operating shaft portion between a first position in which the connection portion contacts the rod so as to connect to the rod, and a second position in which the connection portion is away from the rod in the axial direction, and when the operating shaft portion is in the first position:
- a distance between one end of the operating shaft portion and one of the side frames in the axial direction is greater than an insertion amount by which the rod is inserted in the connection portion, the one end of the operating shaft portion faces the connection portion and the one side frame is on a side of the one recliner; and
- the operating shaft portion is connected to the one recliner and is configured to operate the one recliner.

2. The vehicle seat according to claim 1, wherein the one operating pin further includes a restriction portion that restricts movement of the operating shaft portion with respect to the one recliner, up to the second position.

3. The vehicle seat according to claim 1, wherein
the operating pins are constituted by components that are identical to each other,
the other of the operating pins is connected to the rod in a state in which the operating shaft portion of the other operating pin is inserted through the other of the recliners to the insertion depth corresponding to the second position, and
an unlocking lever provided to perform an operation for unlocking both of the recliners is fitted to an extra-length portion of the operating shaft portion of the other operating pin, the extra-length portion protruding from the other recliner to an outside of the vehicle seat.

4. A method for manufacturing a vehicle seat including paired right and left recliners that respectively connect side frames in right and left sides of a seat back to a base that is provided one of on and above a floor; operating pins that are respectively inserted through the recliners in an axial direction, and are configured to rotate about axes thereof to respectively unlock the recliners; and a rod that is configured to integrally connect the operating pins to each other, the method comprising:
- connecting the side frames in the right and left sides of the seat back to each other to form one unit;
- inserting the operating pins through the recliners from a seat inner side in the axial direction to connect the operating pins to the recliners;
- bringing the rod into contact with one of the operating pins, and connecting the rod to the one operating pin; and
- sliding the other of the operating pins to a position in which the other operating pin contacts the rod, and connecting the other operating pin to the rod, wherein
the other operating pin is slid in a direction in which an insertion depth of the other operating pin with respect to the corresponding recliner is reduced while the other operating pin remains inserted through the corresponding recliner that is connected to the corresponding side frame.

5. The vehicle seat according to claim 1, wherein when the one of the operating pins is in the second position and the other operating pin is inserted through the other recliner, the rod is configured to be inserted between the operating pins.

6. The vehicle seat according to claim 1, wherein the one of the side frames is connected to the one recliner.

* * * * *